United States Patent [19]
Bertoni et al.

[11] Patent Number: 5,107,339
[45] Date of Patent: Apr. 21, 1992

[54] METHOD AND APPARATUS FOR STREAM PRINTING IN AN ELECTRONIC REPROGRAPHIC DEVICE

[75] Inventors: Alfred L. Bertoni; John L. Rourke; Kurt T. Knodt, all of Rochester, N.Y.

[73] Assignee: Xerox Corporation, Stamford, Conn.

[21] Appl. No.: 589,532

[22] Filed: Sep. 28, 1990

Related U.S. Application Data

[63] Continuation-in-part of Ser. No. 543,031, Jun. 25, 1990.

[51] Int. Cl.$^5$ .......................... H04N 1/21; H04N 1/23
[52] U.S. Cl. ..................... 358/296; 358/472; 358/496; 358/498
[58] Field of Search ............... 358/296, 401, 472, 486, 358/496, 498

[56] References Cited

U.S. PATENT DOCUMENTS

| | | | |
|---|---|---|---|
| 4,422,102 | 12/1983 | Tamura | 358/296 X |
| 4,511,929 | 4/1985 | Maeda et al. | 358/296 |
| 4,589,035 | 5/1986 | Yamanishi et al. | 358/296 |
| 4,622,594 | 11/1986 | Honjo et al. | 358/498 |
| 4,755,877 | 7/1988 | Vollert | 358/498 X |
| 4,903,146 | 2/1990 | Nakahara | 358/498 X |
| 4,920,421 | 4/1990 | Stemmlls | 358/472 X |
| 4,957,689 | 9/1990 | Ohnishi et al. | 358/296 |

*Primary Examiner*—Benjamin R. Fuller
*Assistant Examiner*—Eric Frahm
*Attorney, Agent, or Firm*—Oliff & Berridge

[57] ABSTRACT

A print job processing method and apparatus for use in an electronic reprographic system are described. Original documents of a job to be printed are scanned to provide signals for storage. The signals are transferred to a printer for print generation. An optimum time to commence printer operation is automatically determined in accordance with at least one of the number of original documents, the thickness of original documents, scanner speed, printer speed, and number of print jobs in the system. The optimum time is determined such that the maximum overlap is achieved between scanner operation and printer operation.

26 Claims, 12 Drawing Sheets

FIG. 9A

```
1   GetStartPageSFM: PROCEDURE [
        scanPPM,formatPPM, markPPM: LONG CARDINAL,
        formatBuffer: LONG CARDINAL,
        pageCount: LONG CARDINAL]
5   RETURNS [scanPageToStartFormat, formatPageToStartMark: LONG CARDINAL] =
    BEGIN
        scaleFactor: CARDINAL = 32;
        bufTime: LONG INTEGER;
        timeToScanAPage, timeToFormatAPage, timeToMarkAPage: LONG INTEGER;
10      timeToStartFormat, timeToStartMark: LONG INTEGER;
        totalScanTime, totalFormatTime, totalMarkTime: LONG INTEGER;
        timeFormatShouldComplete: LONG INTEGER;
        numerator: LONG CARDINAL = MAX [scanPPM, formatPPM, markPPM] * scaleFactor;
        timeToScanAPage ← numerator/scanPPM;
15      timeToFormatAPage ← numerator/formatPPM;
        timeToMarkAPage ← numerator/markPPM;
        bufTime ← MAX [
            timeToFormatAPage * MIN [formatBuffer, pageCount],
            timeToFormatAPage];
20      totalScanTime ← timeToScanAPage * pageCount;
        totalFormatTime ← timeToFormatAPage * pageCount;
        totalMarkTime ← timeToMarkAPage * (pageCount - 1);
        timeToStartMark ← MAX [totalScanTime - totalMarkTime, timeToScanAPage];
        timeFormatShouldComplete ← MAX [
```

FROM FIG 9A

```
25      totalFormatTime + timeToScanAPage,
        totalScanTime + timeToFormatA Page];
   timeToStartFormat ← MIN [
        MAX [timeToStartMark - bufTime, timeToScanAPage],
        timeFormatShouldComplete - totalFormatTime];
30  timeFormatShouldComplete ← MAX [
        timeToStartFormat + totalFormatTime,
        totalScanTime + timeToFormatAPage];
    timeToStartMark ← MAX [
        timeToStartFormat + MAX [bufTime, timeToFormatAPage],
        (bufTime + timeFormatShouldComplete) - totalMarkTime];
35  scanPageToStartFormat ← (timeToStartFormat + timeToScanAPage - 1) / timeToScanAPage;
    formatPageToStarMark ← MIN [
        ((timeToStartMark - timeToStartFormat) + timeToFormatAPage - 1) / timeToFormatAPage,
        pageCount];
40 END;
```

METHOD AND APPARATUS FOR STREAM PRINTING IN AN ELECTRONIC REPROGRAPHIC DEVICE

CROSS-REFERENCE TO RELATED APPLICATION

This application is a continuation-in-part of copending U.S. patent application Ser. No. 07/543,031, filed June 25, 1990.

This application is related to copending U.S. patent application Ser. No. 07/589,864, filed Sept. 28, 1990, entitled "Dynamic Sheet Count Predictor", the disclosure of which is incorporated by reference herein.

BACKGROUND OF THE INVENTION

1. Field of the Invention

The present invention relates to a system of electronic reprographics and, more particularly, to a system of electronic reprographics having stream printing wherein the printing of jobs may being prior to the completion of scanning of all of the original documents comprising the jobs.

2. Description of the Related Art

In electronic reprographic systems, a document or series of documents comprising print jobs are successively scanned. Upon scanning of the documents, image signals are obtained and stored. The signals are then read out successively and transferred to a printer for formation of the images on paper.

A problem encountered in the electronic reprographic technique, particularly when long jobs are printed, is the lengthy time involved in serially scanning and storing images before printing begins. The "first copy out" time is delayed unnecessarily, thereby increasing the overall time required for printing of the job. This can result in a decrease in overall productivity.

The related art has disclosed systems which reduce job turn around time by beginning a printing operation prior to completing the scanning of all of the originals for the job.

U.S. Pat. No. 4,511,928 to Colomb discloses a system for image reproduction which provides a "print while store" function which allows images to be simultaneously stored and printed. The system includes a primary microprocessor which controls the acquisition and storage of images, and a printer control microprocessor which controls printing functions. In operation, the primary microprocessor receives image data from image acquisition circuitry, stores the received image data, and transfers the stored image data to a printer buffer memory. The printer control microprocessor transfers image data to the printer buffer memory to the printer for printing. The operations of the primary and printer control microprocessors are controlled such that the printer control microprocessor controls printing while further image data is being acquired by the primary microprocessor, thus the "print while store" capability is realized.

U.S. Pat. No. 4,422,102 to Tamura discloses a laser recording apparatus for simultaneously scanning and reading out data from adjacent scan lines. More particularly, Tamura discloses a system in which an original to be recorded is read by scanning the original line by line so as to generate signals corresponding to each line scan. The signals are stored in a memory and while the original is still being scanned, the signals stored in memory are read out for controlling a laser recording apparatus.

U.S. Pat. No. 4,589,035 to Yamanishi et al discloses an image forming apparatus for efficiently producing copies of an original document. While a document is optically scanned to produce image signals related to the scanned document, a first copy of the scan image is formed, and the image signals produced by scanning are also stored for use in printing. Subsequent copies of the scanned document are formed from the signals stored in memory, thus allowing faster reproduction of multiple copies.

U.S. Pat. No. 4,903,146 to Nakahara discloses a digital image forming apparatus wherein a job is printed based upon document information stored in memory. A quick-start operation is described wherein one document is read while another document is being printed.

A research disclosure 31718 to a Document Copier with Job Queuing discloses a copier which enables scanned data to be removed from a job image buffer and transmitted to the writer at the same time data is being written to the buffer. An optimum time for printing is not determined.

While the related art recognizes that printing can be initiated before document scanning is completed, the art does not maximize efficiency of such a system by minimizing job turn around time.

OBJECTS AND SUMMARY OF THE INVENTION

Accordingly, one object of the present invention is to provide a stream printing apparatus which allows a printing function to start early so as to improve first copy out time and overall productivity.

Another object of the present invention is to estimate the size of a job before it is completely scanned so that an optimum start time can be calculated for printing thus reducing first copy out time and job turn around time.

A further object of the present invention is to provide a stream printing apparatus in which it is ensured that scanning of the last document is completed before printing of the last document.

To achieve the foregoing and other objects, nd to overcome the shortcomings discussed above, a stream printing apparatus is provided which automatically determines the optimum time to commence operation of the printer during scanning of the original documents so that scanning of the documents is completed before printer operation is completed, thereby maximizing the overlap of scanner operation and printer operation.

BRIEF DESCRIPTION OF THE DRAWINGS

The invention will be described in detail with reference to the following drawings in which like reference numerals refer to like elements and wherein:

FIG. 9A-B is a computer program of a computation procedure according to the present invention.

DETAILED DESCRIPTION OF THE PREFERRED EMBODIMENTS

Figure 1:
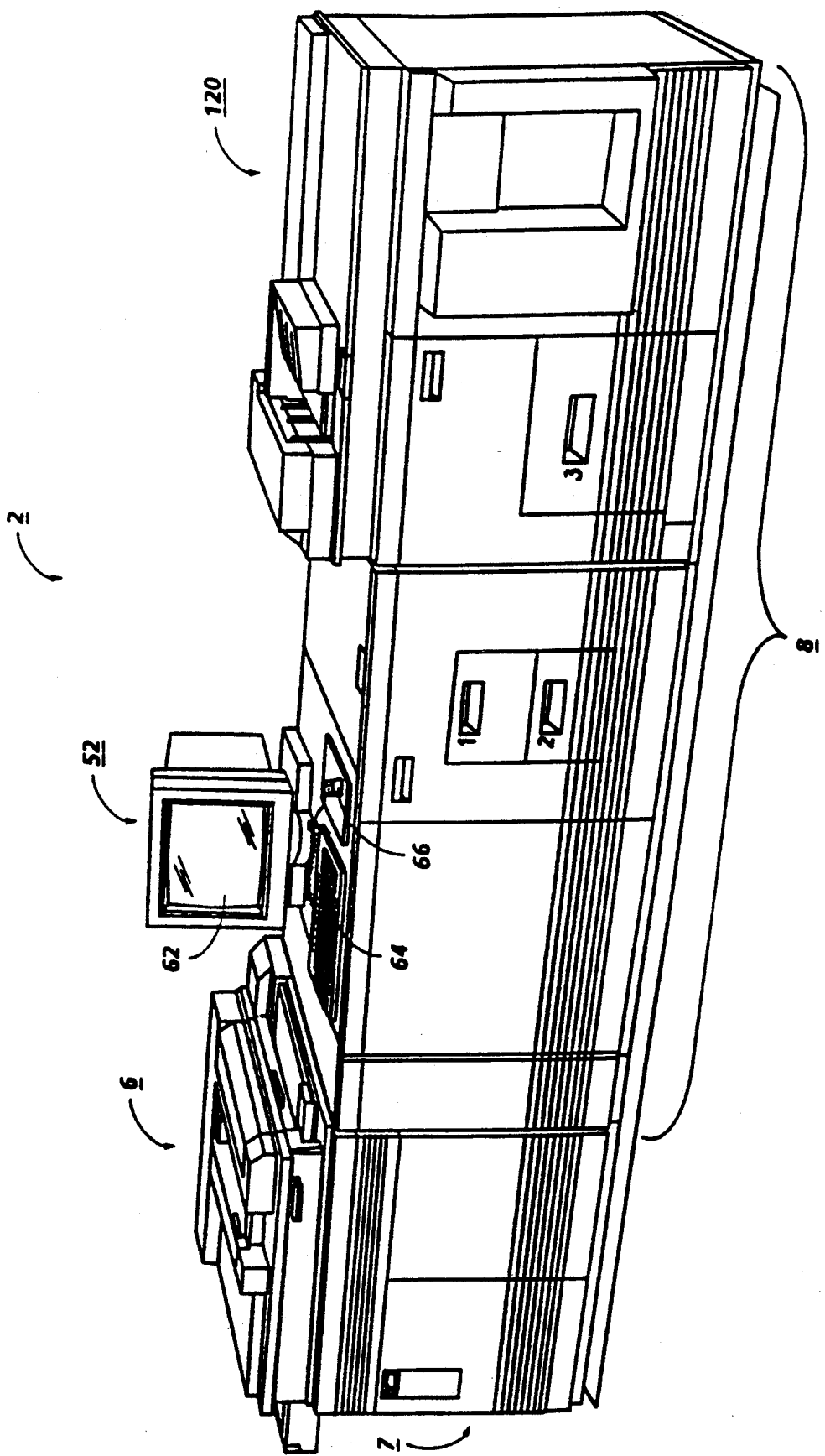
FIG. 1 is a view depicting an electronic printing system incorporating the print media identification system of the present invention.
Figure 2:
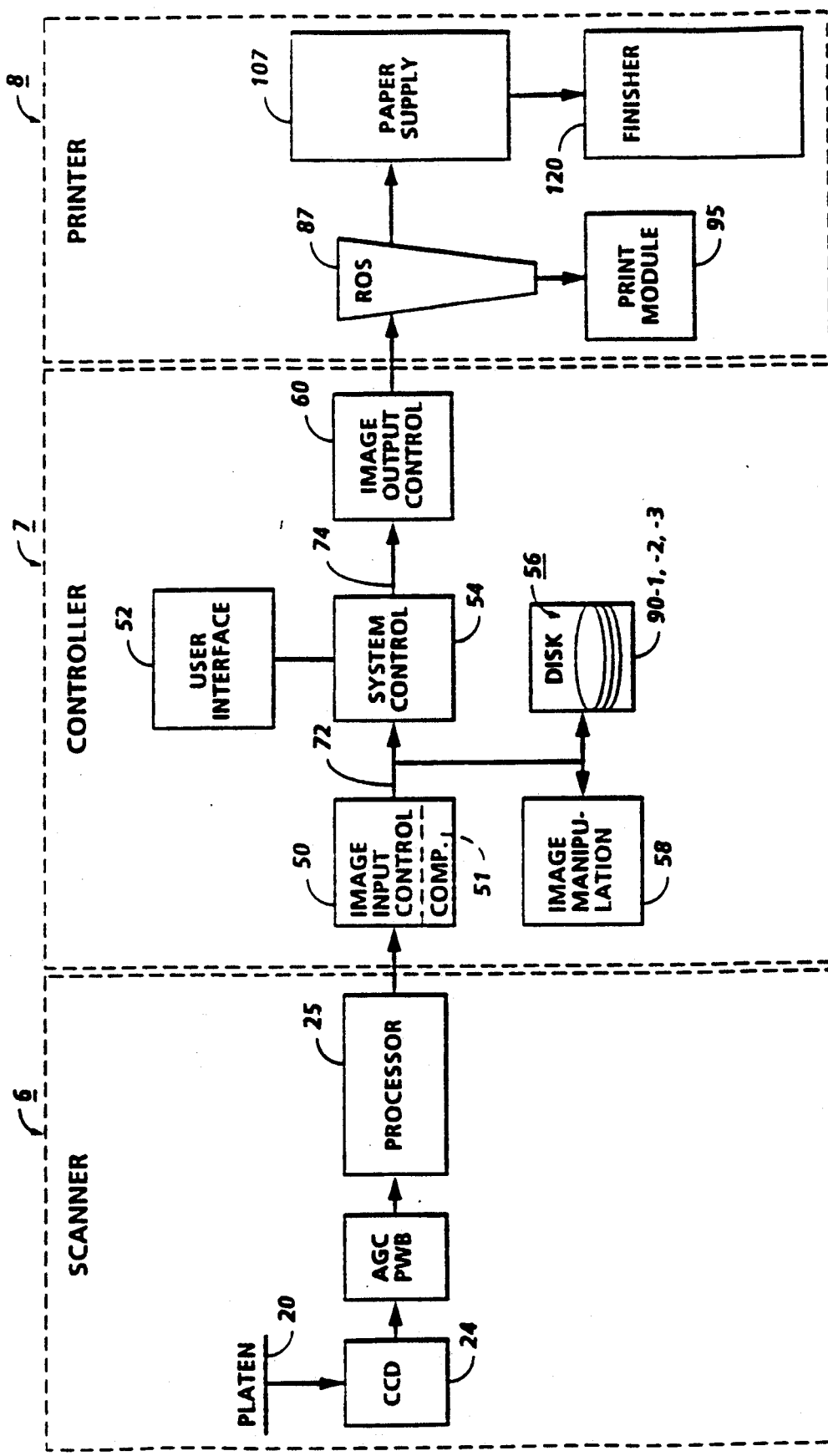
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
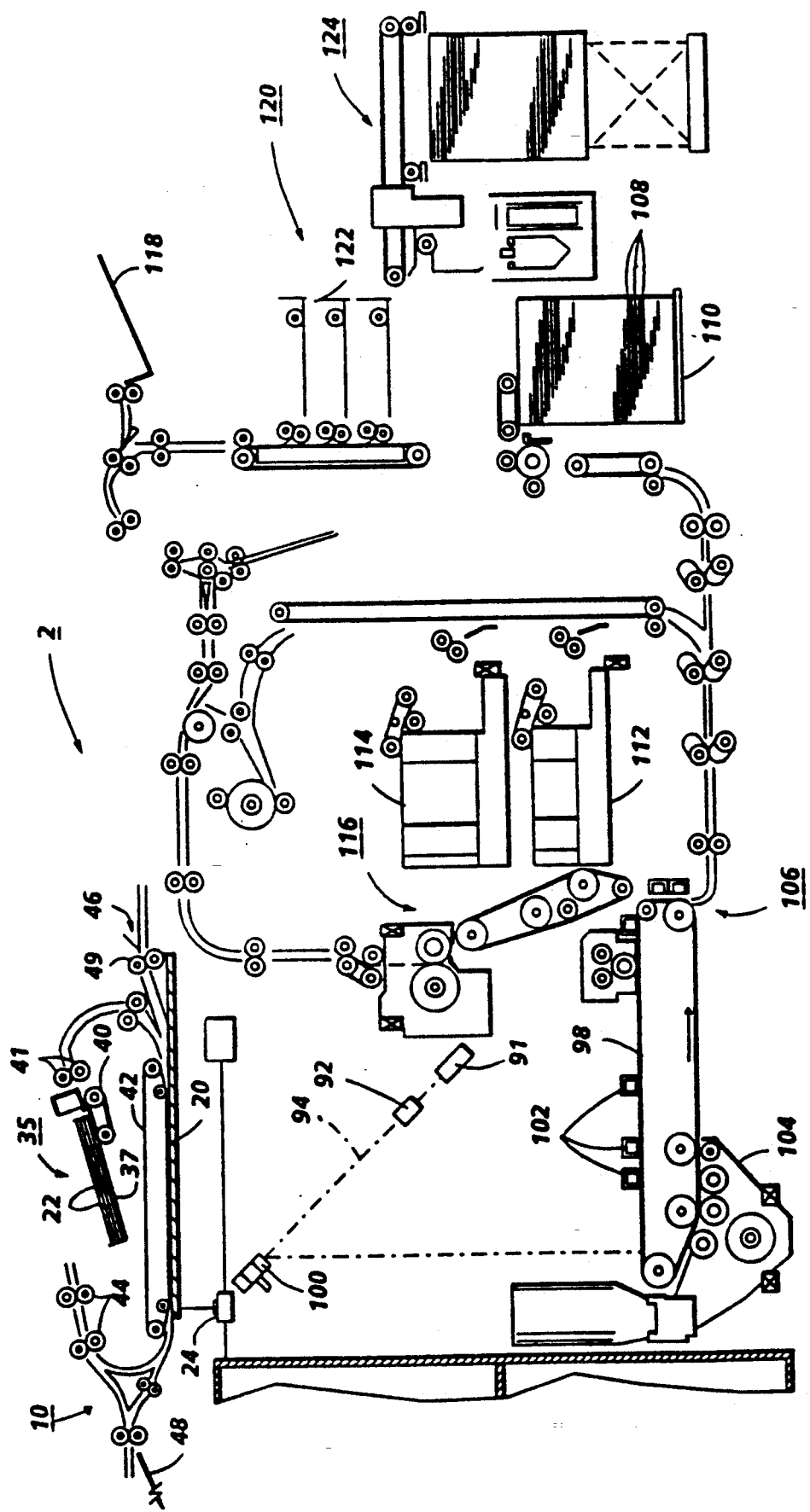
FIG. 3 is a plan view illustrating the principal mechanical components of the printing system shown in FIG. 1.
Figure 4:
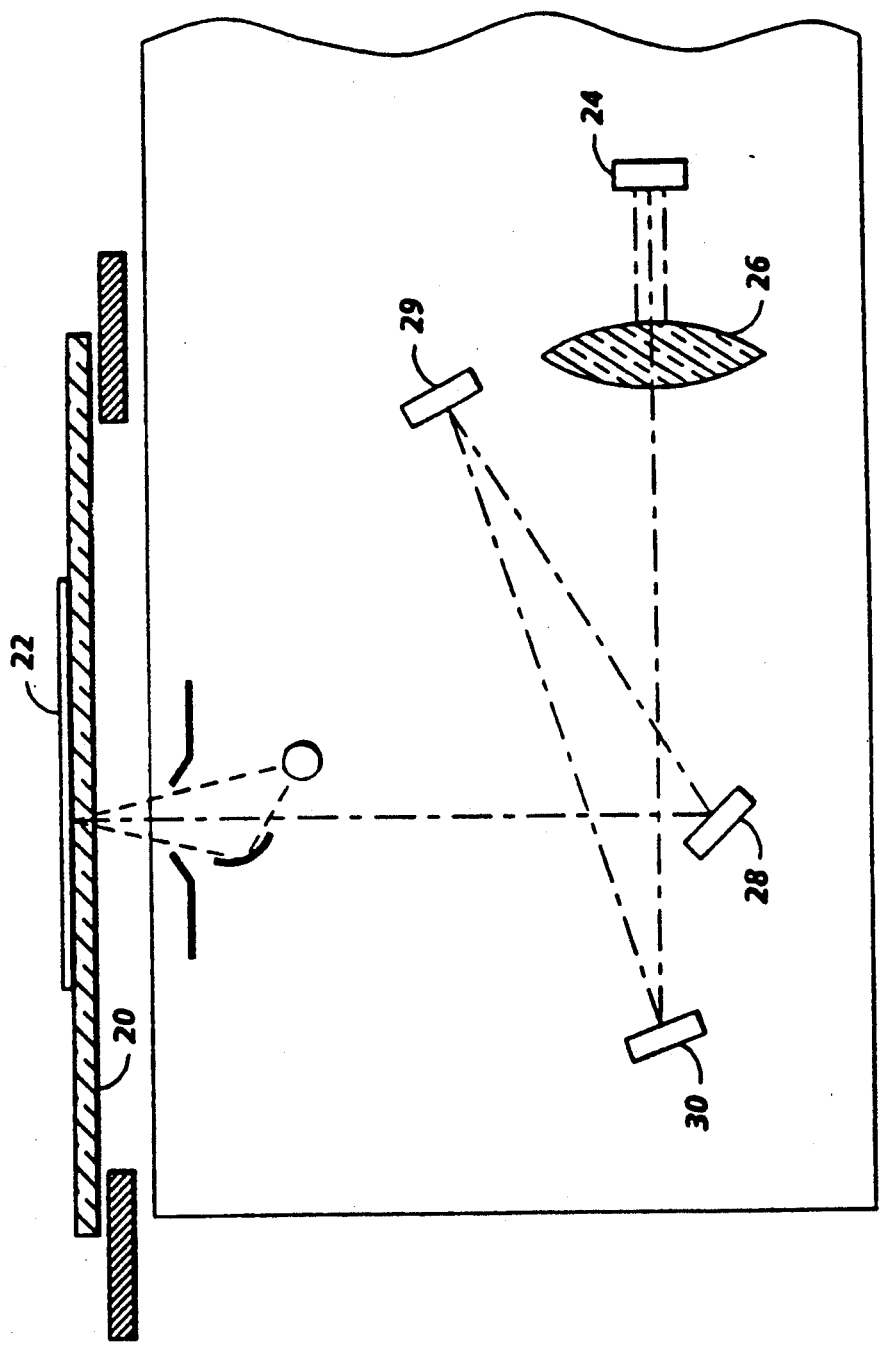
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 27 and mirrors 28, 29, 30 cooperate to focus array 24 on a line-like segment of platen 20 and the document being scanned thereon. Array 24 provides image signals or pixels representative of the image scanned which, after passage through an automatic gain control printed wiring board and suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADH) 35 operable in either a Recirculating Document Handling (RDH) mode or a Semi-Automatic Document Handing (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 95 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print medias 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image input controller 50 on printed wiring board (PW) 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touch-screen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Figure 5A:
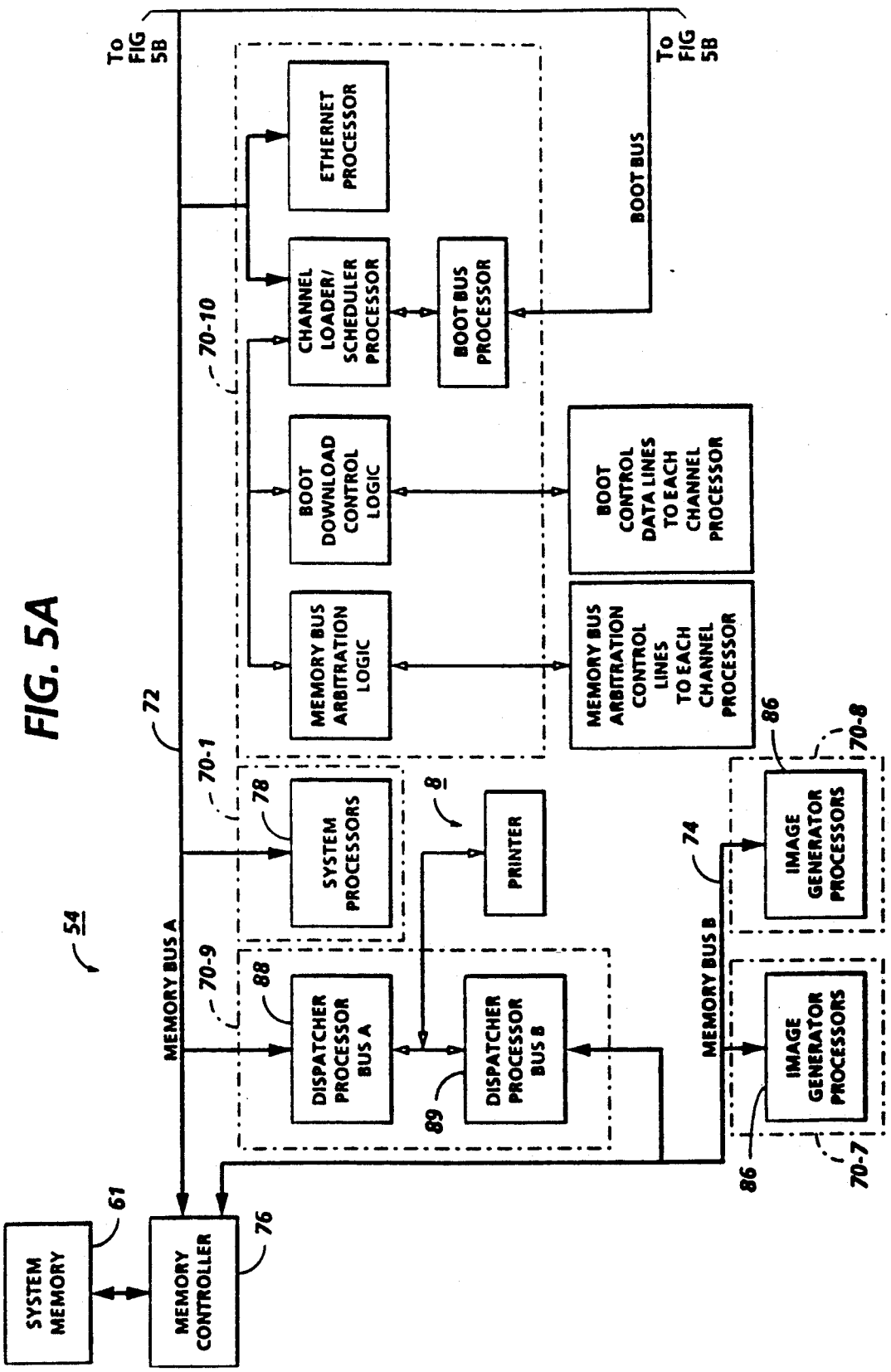
FIGS. 5A, 5B and 5C comprise a schematic block diagram showing the major parts of the control section for the printing system shown in FIG. 1.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 5B:
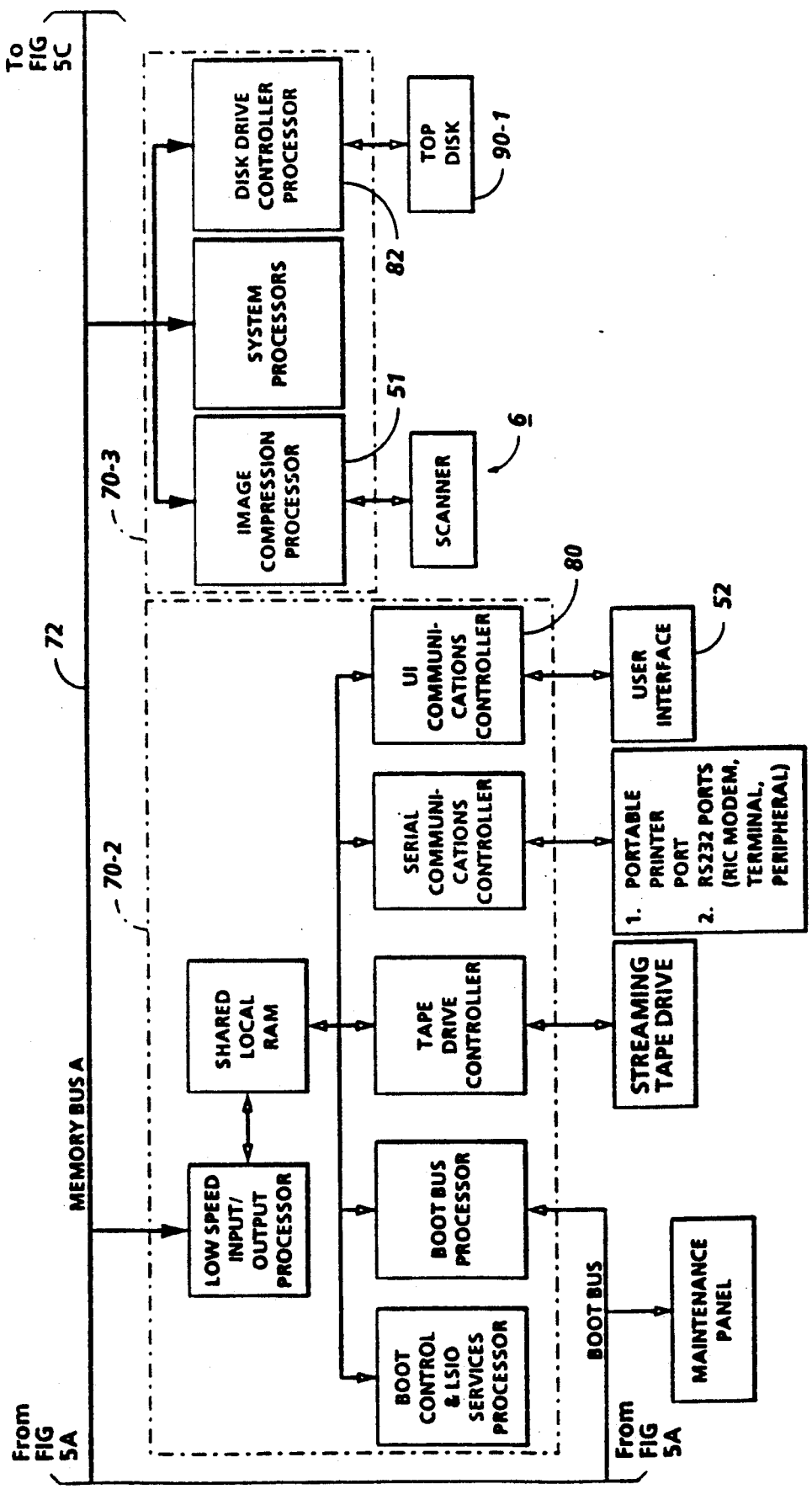
Figure 5C:
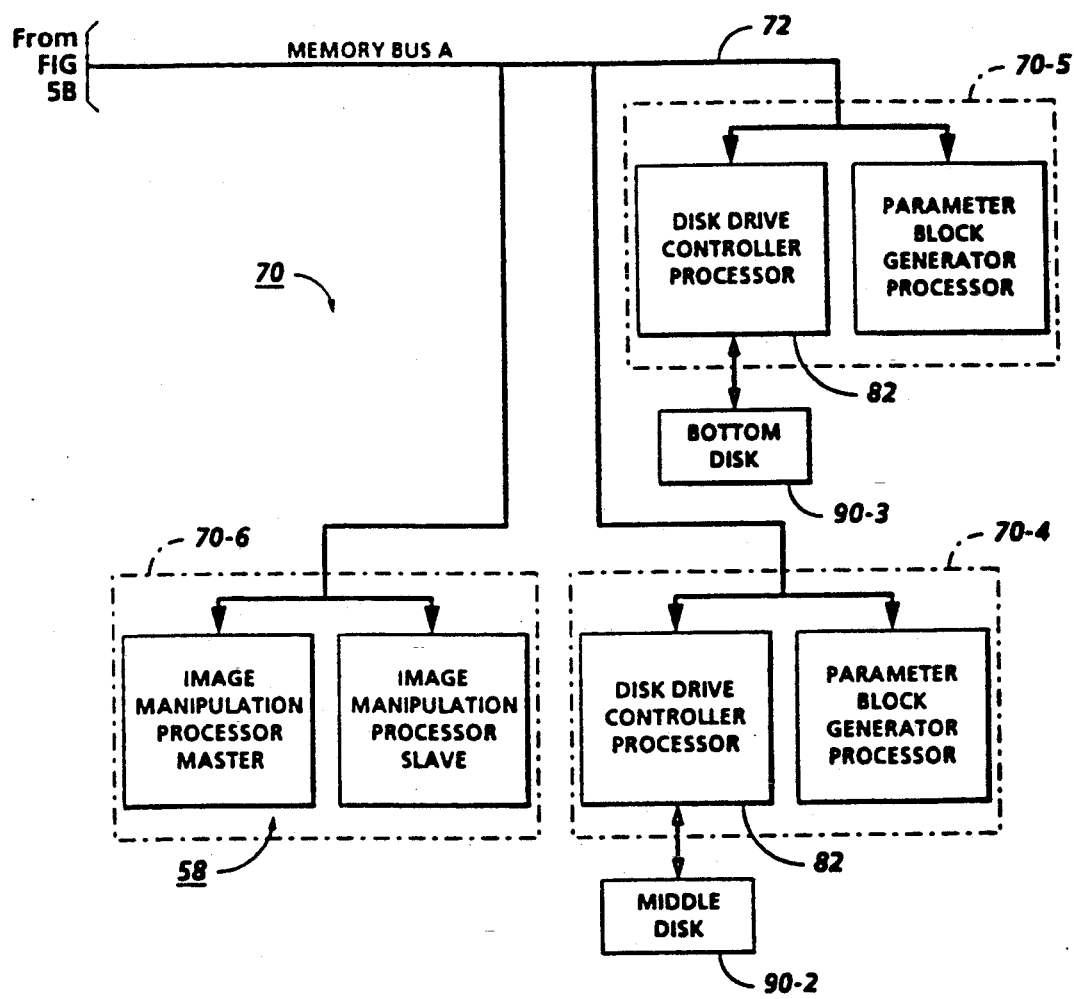

Referring particularly to FIGS. 5A–5C, control section 7 includes a plurality of Printed Wiring Boards (PWB's) 70, PWB's 70 being coupled with one another and with System Memory 61 by a pair of memory buses 72, 74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 790-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

Figure 6:
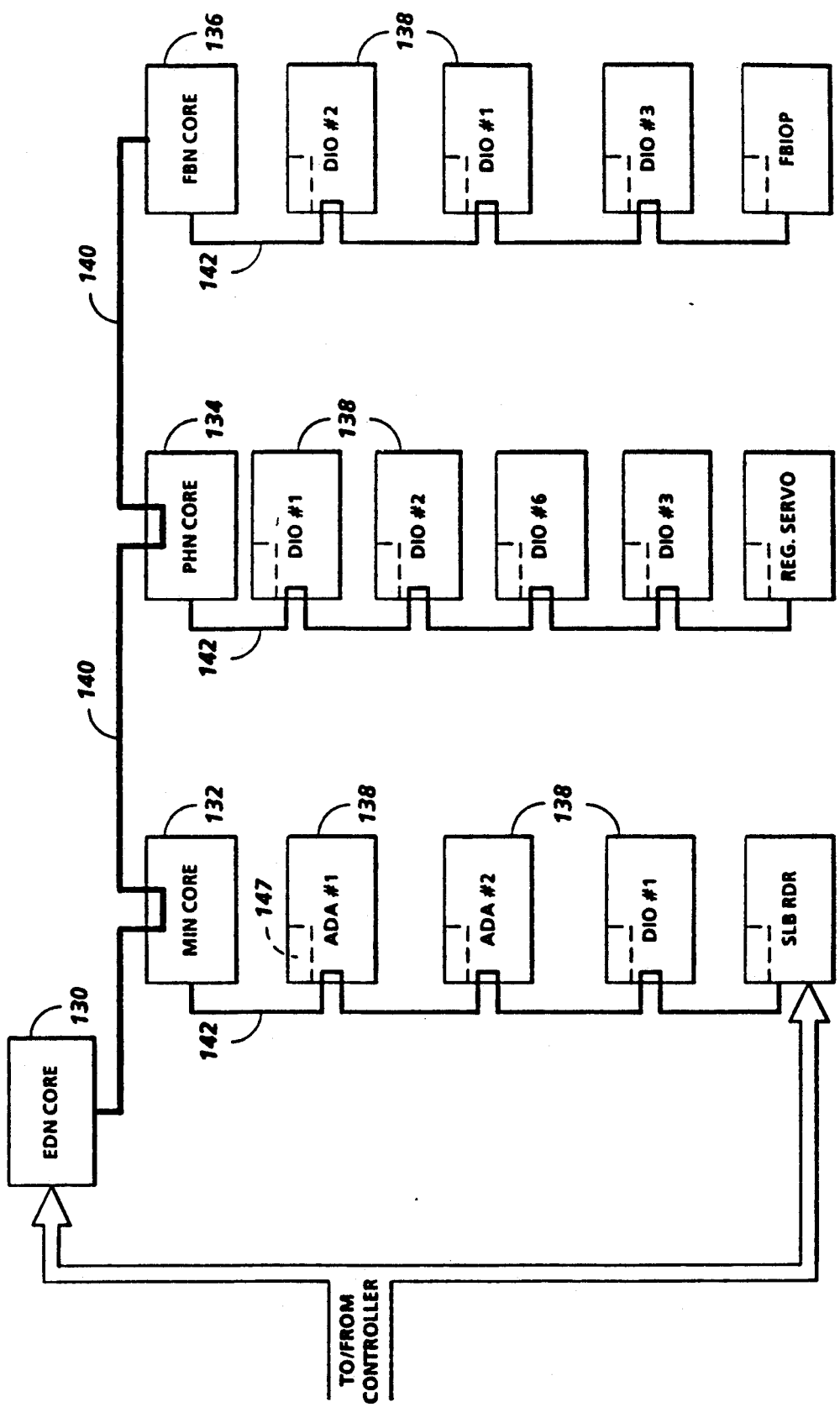
FIG. 6 is a block diagram of an Operating System, together with Printer Wiring Boards and shared line connections for the printing system shown in FIG. 1.

Referring particularly to FIG. 6, system control signals are distributed via a plurality of printed wiring boards (PWB's). These include electronic data node (EDN) core PWB 130, Marking Imaging core PWB 132, Paper Handling core PWB 134, and Finisher Binder core PWB 136 together with various Input/Output (I/O) PWB's 138. A system bus 14 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 13 having a boot ROM 147 for controlling downloading of Operating System software to the PWB, fault detection, etc. Boot ROMs 147 also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

Figure 8:
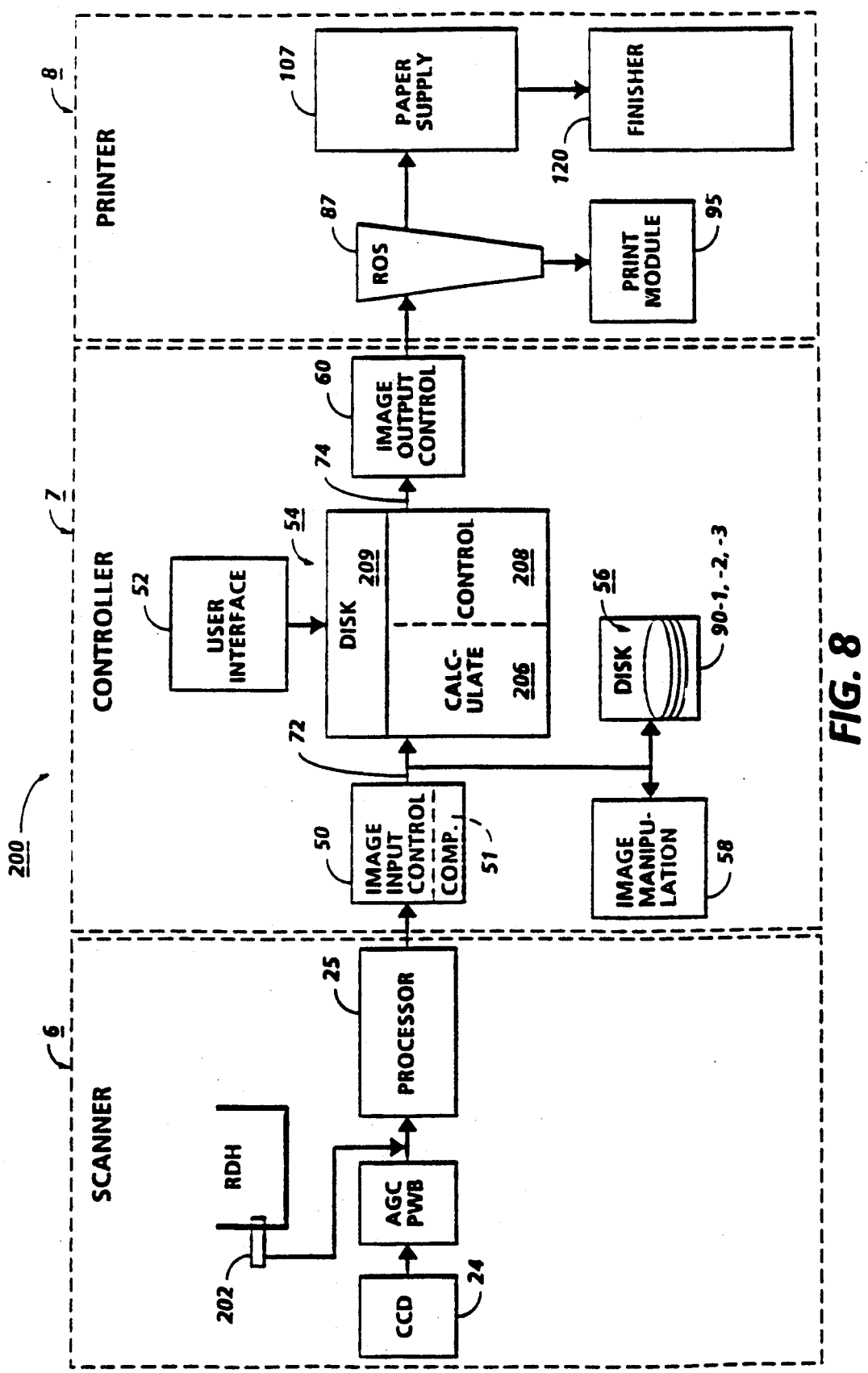
FIG. 8 is a block diagram of an apparatus for effecting stream printing in the system shown in FIG. 1.

Referring to FIG. 8, there is shown an apparatus 200 to effect stream printing in system 2 wherein printing begins before scanning is completed such that maximum overlap is obtained between scanning and printing. Set separator 202, a lever which is placed on a job to be printed and moves downward in accordance with removal of originals being fed through the system, provides a signal indicative of the number of originals which are to be scanned. The signal can indicate initial height of set separator 202 before scanning has begun, the distance set separator 202 ha moved over a predetermined time period following the beginning of scanning in accordance with the total number of sheets in the stack, etc. The signal can be provided, for example, by an optical sensor responsive to height variations. Copending U.S. patent application Ser. No. 07/589,864, the disclosure of which is incorporated by reference herein, discloses a dynamic sheet count predictor which can be used in accordance with the present invention.

The signal from set separator 202 is provided to scanner processor 25. The signal is then provided to disk 209 of system control 54 of controller 7 by way of image input control 50. System control 54 performs a calculate function 206 responsive to the height signal to determine the approximate number of originals to be scanned for each print job assuming a predetermined thickness of each original in the set of documents, the calculate function providing an approximation of the number of sheets to be scanned. Preferably, the predetermined thickness used in the calculate function 206 can be varied depending on the type of paper to be used. System control 54 further contains data regarding the speed of operation of scanner 6, speed of printer 8 and the number of separate jobs existing in the system. The speed of the scanner is usually about 25 impressions per minute, while the speed of the printer is usually about 135 prints per minute. This data can e stored on disk 209 or can be input to system control 54 via user interface 52.

System control 54 assembles all this data (e.g., number of originals, speed of scanning, speed of printing and number of jobs or sets of documents to be printed) to determine an optimum time to commence printer operation. That determination is preferably based on experimental data such that the control function 208 consults a map which identifies an optimum start time based on the sensed parameter of number of originals speed of scanning and speed of printing. Alternatively, a formula can be constructed based on the experimental data to calculate the optimum start time. It is important, however, that the control function should be conservative in its determination of optimum start time to ensure that any original is scanned before the printer calls for that original. If the control function 208 is too aggressive in its calculation of optimum start time, it may result in the printer calling for a particular original from the scanner before the scanner has scanned the desired original. This situation reduces printer productivity since it must now wait for the scanner. Once the optimum start time is determined, control function 208 provides a signal indication of the start time by way of image output control 60 to printer 8 to commence operation thereof.

The operation of apparatus 200 is now described. A job comprising a set of original documents is placed in a recirculating document handler. Set separator 202 determines how large the set is. As documents of different thicknesses are scanned in electronic reprographic systems, user interface 52 can be used to input paper thickness. Optionally, a standard thickness can be stored in the system and any variations therefrom can be input using interface 52. On the basis of the determination of the size of the set of documents and the paper thickness, the number of documents to be scanned is approximated.

An algorithm is set forth herein which can be used to determine when to start formatting and marking a job. The following definitions are used in the algorithm:

scan—The process of capturing one or more images electronically and adding these images to a job.

format—The process of taking one or more scanned images and putting them into a format that the printer understands.

mark—The process of reading the formatted output and printing the scanned images on paper.

page—This represents a single printed page on a job, a page may be duplex (printing on both sides of the page), or simplex (printing on the front of the page only).

job—One or more scanned images which are to be printed in an "n" to one order, starting with the last page on the job. "n" represents the total number of output pages on the job.

There are several constraints that are applied in order to determine when the format and mark functions should be started on a job that is currently in the scan function.

The basic algorithm is as follows:

(1) Start mark as soon as possible after scan has started, with the constraint that the mark process is always at least a predetermined number of pages behind the format process (2) Start the format process so that it will allow the first constraint to be realized, and will run format for the shortest possible time. The format process is started as late as possible while still allowing the mark process to complete as soon as possible, such that the mark process is always behind the format process by at least the predetermined number of pages.

The attached procedure of FIG. 9 could be used to compute when to start format and mark on a job that is being scanned in. The procedure accepts several parameters, the parameter value being computed as follows:

scan PPM: The scan rate (scanPPM) is equal to the time it takes to feed, scan, and process one side of an RDH document. The scan rate is determined by the width of the document, which can be 8 to $8\frac{1}{2}$ inches, and the scale factor. Documents that are reduced or scanned at normal magnification, are scanned at a rate of four inches per second. Documents that are scaled above 100% are scanned at a rate of two inches per second.

An additional half second is added to the scan time of each page to account for the feed time and processing time of each page. For example, an $8\frac{1}{2}'' \times 11''$ document would take $(8.5 \div 4) + 0.5 = 2.625$ seconds to complete, which translates to a rate of approximately 22 pages per minute.

formatPPM: The format rate (formatPPM) is equal to the time it takes to format one output page. This rate can, for example, be set at 136 pages per minute for a simplex output page and 68 pages per minute for a duplex output page.

markPPM: The mark rate is equal to the amount of time the marker will use each page on a job (how long it takes to print the first set of copies of each page). This rate depends on the output destination, copy count, output paper size, output plex, and whether the job is collated or not. The rate can, for example, be determined as follows:

The ppm (page per minute) value (used below) is the rate at which the IOT prints pages. This rate partially depends on the document width, for documents of width greater than 9 inches, the rate is 58 pages per minute (ppm=58), for documents of width less than or equal to 9 inches, the rate is 137 pages per minute (ppm=137). If the output pages are duplex (printing on front and back), the ppm value is divided by two.

The copyCount constant represents the number of copies of the job to be printed.

If the Job is to be output uncollated, the marker will use the pages at a rate of (ppm/copyCount).

If the Job is to be output collated, the marker will require pages at a rate based on the output destination and copy count, these rates are:

output to sample tray rate is equal to ppm output to finishers and copy count=1, rate is equal to ppm output to finisher and copy count=2, rate is equal to ppm/2 output to finisher and copy count=3, rate is equal to ppm/3 output to finisher and copy count>3, rate is equal to ppm/2

If the ppm value is computed to zero, it is set to one.

formatBuffer: This value represents the number of pages that must be ready (formatted) for the marker to process at all times. This value can, for example, be set at eight.

pageCount: This non-zero value represents the number of output pages expected on the completed job.

The following is a line by line description of the procedure shown in FIG. 9.

| | |
|---|---|
| 1 | Procedure declaration. |
| 2–4 | Procedure parameter declarations, see above for parameter definitions. |
| 5 | Procedure return value declarations. The scanPageToStartFormat is used to return the scanned page number to start format on. The formatPageToStartMark is used to return the formatted page number to start mark on. |
| 6 | Start of procedure body. |
| 7 | Constant declaration, this value is used to help minimize roundoff error. |
| 8–12 | Local variable declarations. |
| 13 | Local variable used to convert the scanPPM, formatPPM, and markPPM parameters to normalized time values. |
| 14 | Computes the normalized, scaled, time to scan a page, and assigns the value to the timeToScanAPage variable. |
| 15 | Computes the normalized, scaled, time to format a page, and assigns the value to the timeToFormatAPage |

-continued

| | variable. |
|---|---|
| 16 | Computes the normalized, scaled, time to mark a page, and assigns the value to the timeToMarkAPage variable. |
| 17-19 | Computes the amount of time that must be between the format process and the mark process at all times, the formatTime value is assigned the maximum of the two values<br>A) the minimum value of<br>   1) the time to format at formatBuffer pages<br>   2) the time to format all the pages (pageCount) on the job<br>B) time to format a page, in case the formatBuffer is zero |
| 20 | Compute the time to scan all the pages on the job, and assign value to totalScanTime variable. |
| 21 | Compute the time to format all pages on the job, and assign value to totalFormatTime variable. |
| 22 | Compute the time when mark all the pages on the job have been started, and assign value to totalMarkTime variable. Note that the pageCount value is decremented by one since the time to mark the last page of the job is not utilized by scan or format. |
| 23 | Computes the optimal time to start the mark process, without considering the format time or the format buffer. If the mark process runs at the same speed or slower than the scan process, the mark process could be started after one page has been scanned, i.e., timeToScanPage. If the mark process is faster than the scan process, mark can be started so that the last page will have been completed, timeToMarkAPage time units after scan has completed the last page. This value is assigned to the timeToStartMark variable. |
| 24-26 | Computes the earliest time the format process could complete processing all the scanned pages. The value is assigned to the timeFormatShouldComplete variable. |
| 27-29 | Computes when to start the format process. This statement takes into account the time for the format buffer. The value is assigned to the timeToStartFormat variable. |
| 30-32 | Re-computes the time format should complete based on the timeToStartFormat value computed in the previous statement. The format time may be constrained by the scan time if format is faster than the scan process, otherwise the format time is longer than the scan time and is based on the total format time. The value is assigned to the timeFormatShouldComplete variable. |
| 33-35 | Computes when to start the mark process based on the new timeFormatShouldComplete and the totalFormatTime values. If the mark process is slower than the format process, the mark process will be started at the time format is started plus the larger value of the buffer time and timeToFormatAPage. This value is assigned to the timeToStartMark variable. |
| 36 | Converts the timeToStartFormat value into its appropriate page number value. The value is rounded up to the nearest whole number. This value is assigned to the return parameter scanPageToStartFormat. |
| 37-39 | Converts the timeToStartMark value into its appropriate page number value. The value is rounded up to the nearest whole number. The pageCount value is checked to make sure the returned page number does not exceed the total number of pages in the job. This value is assigned to the return parameter End of procedure body. |

System control 54 contains, or can be fed via interface 52, data regarding the speeds of operation of scanner 6 and printer 8. Upon calculation of the number of documents in a job, control 54 then determines the optimum time to commence operation of printer 8 to ensure maximum overlap of scanner operation and printer operation, thereby reducing the time required to obtain the first copy out. Control 54 can, by way of example, contain a lookup table relating the varying factors of number of documents, speed of scanner operation, speed of printer operation, paper thickness and number of jobs existing in the system.

When system 2 is in a full execution mode (i.e., the photoreceptor is being charged and discharged) but a sheet of paper is not being imaged, a pitch skip occurs A single pitch skip occurs during the printing of a job when controller 7 cannot provide the required print image to the printer 8 at the specified print time for that particular image. Each pitch skip encountered represents a period of time when the printer 8, although in operation, is not producing any hard copy output. The percentage of pitch skips is calculated as the total number of pitch skips divided by the total number of impressions made plus the total number of pitch skips.

Printer 8 can be though of as requiring an image file at every print pitch, the images being provided to printer 8 by controller 7. If the controller 7 cannot provide the required image before printer 8 is ready to print it, the printer 8 waits, thus incurring pitch skips. The pitch skip is thus due to the controller 7 not being able to provide the required image flat enough.

In an electronic reprographic system, it is necessary to printer operation that an image be available in order to, for example, eliminate pitch skips. A complete page must therefore be scanned and imaged before it can be printed. Apparatus 200 is thus preferably conservative in its approximation of the number of documents present. This is achieved, for example, by assuming that thin paper is normally being used or by determining the initial height of set separator 202 to be slightly higher than it actually is. By being conservative, it is assured that printer 8 is provided an image to print and does not have to cycle down to cease operation until the final document is scanned and imaged. While this conservative approach is preferably used, it is not necessary. If printer 8 should run out of images to print before scanning of the job is completed, printer 8 suspends operation and automatically resumes printing when enough input from scanner 6 is accumulated. Suspension of operation is, however, not desirable.

The operator can, if desired, disable the above-described determination of the optimum time to commence printer operation. User interface 52 is provided with a dialogue switch. When this switch is turned off, printing of a job will not being until scanning of the job is completed.

Once printing begins in the stream print mode, printer 8 continues in that mode until the job is completed, interrupted or deleted.

System 2 includes two features, "Stop Scan" and "Stop Print" which effect stream printing jobs. Selection of the "Stop Scan" feature at interface 52 causes scanning to stp at the end of a page currently being scanned. Printing continues until images are not longer available or until a "Stop Scan" menu option i.e. delete or resume causes cancellation of the job or requires that printer 8 be purged. The delete menu option causes the operation of scanner 6 to be aborted. The input documents are slewed, and the job and its associated images are deleted from system 2. If stream printing has begun, the operation of printer 8 is also aborted, and the completed portion of the job is purged from printer 8. The resume menu option causes continuation of stream printing of the job.

Selection of the "Stop Print" feature at interface 52 causes printing to stop at the nearest logical page boundary. Scanning continues until all originals have been scanned or until a "Stop Print" menu option, i.e. delete, resume, resume and save, or save, causes cancellation of the job. The delete menu option causes the operation of printer 8 to be aborted. The completed portion of the job is purged from printer 8. The operation of scanner 6 is also aborted. The input documents are slewed, and the job and its associated images are deleted from system 2. The resume menu option causes continuation of stream printing of the job. The resume and save menu option, in addition to causing continuation of stream printing, also causes placement of the job images into the system file upon completion of scanning. The save menu option causes the operation of printer 8 to be aborted and the completed portion of the job to be purged from printer 8. The job images are placed into the system file upon completion of scanning.

The stream print mode of operation facilitates recovery operations when disk space has been exceeded. A single job can be segmented into several smaller jobs which are printed separately. File space can be fully utilized by allowing the operator to delete jobs and continue printing. Pages of a job can be printed individually and thereafter deleted.

The above-described stream printing operation is available for all copy modes except simplex to duplex (one-sided to two-sided) output. Since scanning and printing operations both begin at the last sheet of a job and end at the first sheet, the problem encountered with stream printing in creating simplex to duplex output is that the exact number of originals must be known and printing must being appropriately so that it can be determined whether the first printing page should contain images on both of its sides, or just one side. It must therefore be known initially how many images are present, thus requiring the complete scanning of a job prior to printing of the job.

The apparatus reduces first copy out time, job turns around time and overall productivity of the electronic reprographic system. It further provides efficient utilization of the components of the system.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of processing a print job in an electronic reprographic system, comprising the steps of:
   scanning a set of original documents which comprise the print job;
   converting the scanned documents to electronic signals;
   storing said electronic signals for print generation; and
   commencing printing of the stored electronic signals during scanning of said set of original documents to minimize a time period between completion of scanning of said original documents and completion of printing of the stored electronic signals.

2. The method of claim 1, further comprising the steps of:
   automatically determining an optimum time to commence printing of the stored electronic signals during the scanning of the set of original documents; and
   commencing printing of the job at the determined optimum time.

3. The method of claim 1, wherein the steps of commencing printing during scanning include the step of ensuring that a last document in said set of original documents is canned before printing of said last document.

4. The method of claim 1, wherein the step of commencing printing during scanning includes a step of ensuring that storing of a last document in said set to be scanned is completed before printing of said last document.

5. An apparatus for processing a print job in an electronic reprographic system, comprising:
   means for scanning a set of original documents which comprise the print job;
   means for converting the scanned documents to electronic signals;
   means for storing said electronic signals for print generation; and
   means for commencing printing of the stored electronic signals during scanning of said set of original documents to minimize a time period between completion of scanning of said original documents and completion of printing of the stored electronic signals.

6. The apparatus of claim 5, further comprising
   means for automatically determining an optimum time to commence printing of the stored electronic signals during the scanning of the set of original documents; and
   means for commencing printing of the job at the determined optimum time.

7. The apparatus of claim 5, wherein the means for commencing printing during scanning includes means for ensuring that a last document in said set of original documents is scanned before printing of said last document.

8. The apparatus of claim 5, wherein the means for commencing printing during scanning includes means for ensuring that storing of a last document in said set to be scanned is completed before printing of said last document.

9. A method of processing print jobs in an electronic reprographic system, comprising the steps of:
   scanning a set of original documents which comprise a print job;
   converting the scanned documents to electronic signals;
   storing said electronic signals for print generation; and
   automatically determining an optimum time to commence printing of the stored electronic signals during the scanning of the set of original documents such that scanning of said set will be completed before printing will be completed to maximize overlap of scanning and printing.

10. The method as recited in claim 9, further comprising the step of commencing printing of the job at the determined optimum time.

11. The method as recited in claim 9, wherein the step of automatically determining the optimum time to commence printing includes the step of determining an approximate number of original documents being scanned.

12. The method as recited in claim 9, wherein the step of automatically determining the optimum time to commence printing includes the step of determining a thickness of the original documents to be scanned.

13. The method as recited in claim 9, wherein the step of automatically determining the optimum time to commence printing includes the step of determining a speed of scanning of original documents.

14. The method as recited in claim 9, wherein the step of automatically determining the optimum time to commence printing includes the step of determining a speed of printing of the job.

15. The method as recited in claim 9, wherein the step of automatically determining the optimum time to commence printing includes the step of determining a number of jobs existing in the electronic reprographic system.

16. The method as recited in claim 9, further comprising the step of:
   disabling the optimum time determination such that printing of the job is not commenced until scanning is completed.

17. The method of claim 9, wherein the step of automatically determining ensures that storing of a last document in said set to be scanned is completed before printing of said last document.

18. An apparatus for processing a print job in an electronic reprographic system, comprising:
   means for scanning a set of original documents which comprise the print job;
   means for converting the scanned documents to electronic signals, said converting means being connected to said scanning means;
   means for storing said electronic signals for print generation;
   means for printing the job; and
   means for automatically determining an optimum time to commence operation of the printing means during the scanning of the set of original documents, and for ensuring that scanning of the documents by said scanning means is completed before operation of said printing means is completed to maximize overlap of scanning means operation and printing means operation.

19. The apparatus as recited in claim 1, further comprising:
   means for commencing operation of said printing means at said determined optimum time.

20. The apparatus as recited in claim 18, wherein:
   said determining means includes means or detecting an approximate number of original documents to be scanned by said scanning means.

21. The apparatus as recited in claim 20, wherein:
   said determining means includes means for determining an approximate thickness of original documents scanned by said scanning means.

22. The apparatus as recited in claim 18, wherein:
   said determining means includes means for determining a speed at which said scanning means scans the set of original documents.

23. The apparatus as recited in claim 18, wherein:
   said determining means includes means for determining a speed at which said printing means prints the job.

24. The apparatus as recited in claim 18, wherein:
   said determining means includes means for determining a number of print jobs existing in he electronic reprographic system.

25. The apparatus as recited in claim 18, further comprising:
   means for disabling the determining means such that operation of said printing means is not commenced until completion of scanning by said scanning means.

26. The apparatus of claim 18, wherein the determining means includes means for ensuring that a last document in said set is stored before printing of said last document.

* * * * *